(12) United States Patent
Iwamoto (10) Patent No.: US 9,086,603 B2
(45) Date of Patent: Jul. 21, 2015

(54) LIQUID CRYSTAL DISPLAY DEVICE

(71) Applicant: STANLEY ELECTRIC CO., LTD., Tokyo (JP)

(72) Inventor: Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 90 days.

(21) Appl. No.: 13/955,908

(22) Filed: Jul. 31, 2013

(65) Prior Publication Data

US 2014/0036215 A1  Feb. 6, 2014

(30) Foreign Application Priority Data

Jul. 31, 2012  (JP) ................. 2012-169635

(51) Int. Cl.
*G02F 1/1345* (2006.01)
*G02F 1/1343* (2006.01)
*G02F 1/1339* (2006.01)

(52) U.S. Cl.
CPC ........ *G02F 1/1345* (2013.01); *G02F 1/134327* (2013.01); *G02F 1/134363* (2013.01); *G02F 1/1339* (2013.01)

(58) Field of Classification Search
CPC ............ G02F 1/1345; G02F 1/134327; G02F 1/134363
USPC .......................................... 349/141, 142, 153
See application file for complete search history.

(56) References Cited

U.S. PATENT DOCUMENTS

| 4,260,224 | A | * | 4/1981 | Takayama .................. 349/83 |
| 4,345,249 | A | | 8/1982 | Togashi |
| 6,392,735 | B1 | * | 5/2002 | Tani .......................... 349/156 |
| 6,801,289 | B2 | * | 10/2004 | Ichioka et al. ............. 349/152 |
| 7,436,480 | B2 | * | 10/2008 | Kang et al. ................ 349/149 |
| 7,929,095 | B2 | * | 4/2011 | Lin ............................ 349/139 |

FOREIGN PATENT DOCUMENTS

| JP | 56-91277 A | 7/1981 |
| JP | 07-72491 A | 3/1995 |

* cited by examiner

*Primary Examiner* — James Dudek
(74) *Attorney, Agent, or Firm* — Holtz, Holtz, Goodman & Chick PC (57) ABSTRACT

A liquid crystal display having a liquid crystal layer, a first substrate and a second substrate disposed facing each other and which sandwich the liquid crystal layer. First electrodes and second electrodes are both provided to one surface side of the first substrate. First lead wirings are provided to one surface side of the first substrate each connected to one of the first electrodes. Second lead wirings are provided to one surface side of the first substrate each connected to one of the second electrodes. A jumper wiring is provided to one surface side of the second substrate and superimposed with each portion of two or more second lead wirings of the plurality of second lead wirings and a conductive material interposed between each portion of the two or more second lead wirings and the jumper wiring, between the first substrate and the second substrate.

5 Claims, 9 Drawing Sheets

LIQUID CRYSTAL DISPLAY DEVICE

BACKGROUND OF THE INVENTION

1. Field of the Invention

The present invention relates to a liquid crystal display device that drives a liquid crystal layer on a substrate surface using a horizontal electric field.

2. Description of the Background Art

In a general liquid crystal display device, electrodes are respectively provided to each of a pair of substrates that are disposed facing each other and which sandwich a liquid crystal layer, and brightness control of display area is achieved by producing an electric field in a direction orthogonal to the substrate surface using these electrodes, thereby changing the orientation of the liquid crystal layer. In such a liquid crystal display device, the liquid crystal molecules of the liquid crystal layer are oriented at an incline with respect to the substrate surface when an electric field is applied, causing the inclined direction to be biased in one direction and, in turn, visual angle dependency to occur in the brightness control of display area.

In order to eliminate such a disadvantage, liquid crystal display devices capable of achieving favorable viewing angle dependency have been disclosed in Japanese Unexamined Patent Application Publication No. 56-91277 (hereinafter referred to as "Patent Document 1") and Japanese Unexamined Patent Application Publication No. 07-72491 (hereinafter referred to as "Patent Document 2"), for example. The liquid crystal display devices disclosed in Patent Document 1 and Patent Document 2 provide a display electrode and a common electrode on a surface of one of a pair of substrates, respectively, that are disposed facing each other and which sandwich a liquid crystal layer, and achieve brightness control of display area by producing an electric field in the substantially horizontal direction on the substrate surface using the area between both electrodes, thereby changing the orientation of the liquid crystal layer. With such a liquid crystal display device, viewing angle dependency is not likely to occur in the brightness control of display area since the liquid crystal molecules of the liquid crystal layer change orientation on the substrate surface while remaining in a horizontal state when an electric field is applied, making it possible to achieve favorable viewing angle dependency. Such a liquid crystal display device is called an in-plane switching (IPS) mode liquid crystal display device. The liquid crystal display device disclosed in Patent Document 1 is an active matrix driven type wherein active elements such as a thin film transistor are provided to each crossing part of a display electrode and a common electrode to switch each pixel. On the other hand, the liquid crystal display device disclosed in Patent Document 2 is a simple passive matrix driven type that does not use active elements such as described above.

However, while both IPS mode liquid crystal display devices of the preceding examples assume that a plurality of pixels is disposed in a dot-matrix pattern to display an image, they do not propose a structure suitable for a segment display-type liquid crystal display device comprising an arbitrary display part shape. Specifically, in the IPS mode liquid crystal display devices of the preceding examples, a crossing section always exists in the planar view of the display electrodes and counter electrodes or the lead wirings connected thereto, and the insulation of this crossing section is achieved by interposing an insulating film. The provision of such an insulating film causes an increase in the number of processes at the time of liquid crystal display device manufacture. Hence, according to the liquid crystal display device disclosed in Patent Document 1, the insulating film of the crossing section described above can be formed in conjunction with the formation of a passivation film that is provided to construct the active elements, making insulating film formation less likely to cause an increase in the number of manufacturing processes.

Nevertheless, active elements are generally not provided in the segment display-type liquid crystal display device, resulting in concern that the number of manufacturing processes will increase in a case where the decision is made to provide an insulating film at a crossing section such as described above. On the other hand, while to ensure that a crossing section is not provided requires that all lead wirings respectively corresponding to the display electrode and counter electrode be disposed on the same surface, the amount of lead wirings increases with an increase in the number of display parts, making it difficult to dispose each electrode and lead wiring on the same surface without providing a crossing section.

It is therefore an object of a specific mode of the present invention to provide an IPS mode liquid crystal display device in which it is easy to dispose each electrode and lead wiring on the same surface, and which is suitable for a segment display type.

SUMMARY OF THE INVENTION

The liquid crystal display device according to a specific mode of the present invention comprises a display part for displaying standard characters or designs, further comprising (a) a liquid crystal layer, (b) a first substrate and a second substrate that are disposed facing each other and which sandwich the liquid crystal layer, (c) a plurality of first electrodes provided to one surface side of the first substrate, (d) a plurality of second electrodes provided to one surface side of the first substrate, (e) a plurality of first lead wirings provided to one surface side of the first substrate, each connected to one of the plurality of first electrodes, (f) a plurality of second lead wirings provided to one surface side of the first substrate, each connected to one of the plurality of second electrodes, (g) a jumper wiring provided to one surface side of the second substrate and superimposed with each portion of two or more second lead wirings of the plurality of second lead wirings, and (h) a conductive material interposed between each portion of the two or more second lead wirings and the jumper wiring, between the first substrate and the second substrate.

According to the foregoing configuration, several of the second lead wirings provided to the first substrate side are configured to be connected to each other via the jumper wiring provided to the second substrate side, thereby making it possible to increase the freedom of the wiring layout on the substrate. With this arrangement, each electrode and lead wiring are readily disposed on the same surface without providing a crossing section, making it possible to achieve a direct-multiplex-driven IPS mode liquid crystal display device suitable for a segment display type.

In the foregoing liquid crystal display device, in case an area where the first substrate and the second substrate overlap includes a display area and a peripheral area, preferably, each portion of the two second lead wirings and the jumper wiring are disposed in the peripheral area.

With this arrangement, it is possible to dispose the jumper wiring and the like, which is a section that does not contribute to the display, outside the display area, making it possible to more widely achieve the display area.

The foregoing liquid crystal display device, preferably, may further comprise a sealing material that is interposed between the first substrate and the second substrate in the peripheral area, and encloses the liquid crystal layer, and in this case, each portion of the two or more second lead wirings and the jumper wiring are superimposed with the sealing material and disposed in the peripheral area, and the sealing material comprises conducting properties in at least an area where the sealing material comes in contact with each portion of the two or more second lead wirings and the jumper wiring, and serves as the conductive material as well.

With this arrangement, the sealing material can also function as a conductive material, making it possible to simplify the configuration.

The foregoing liquid crystal display device, preferably, may further comprise a sealing material that is interposed between the first substrate and the second substrate in the peripheral area, and encloses the liquid crystal layer, and in this case, each portion of the two or more second lead wirings and the jumper wiring are disposed further outward than the sealing material in the peripheral area.

Normally, since the area further inward than the sealing material is the display area, it is possible to dispose the jumper wiring and the like outside the display area and thus more widely achieve the display area.

In the foregoing liquid crystal display device, preferably, the plurality of first electrodes and the plurality of second electrodes respectively comprise a plurality of electrode branches, each of the plurality of first electrodes forms a pair with one of the plurality of second electrodes, and a first electrode and a second electrode that form the pair are disposed so that each other's plurality of electrode branches is alternately arranged.

DESCRIPTION OF THE PREFERRED EMBODIMENTS

The following describes embodiments of the present invention with reference to drawings.

Embodiment 1

Figure 1A:
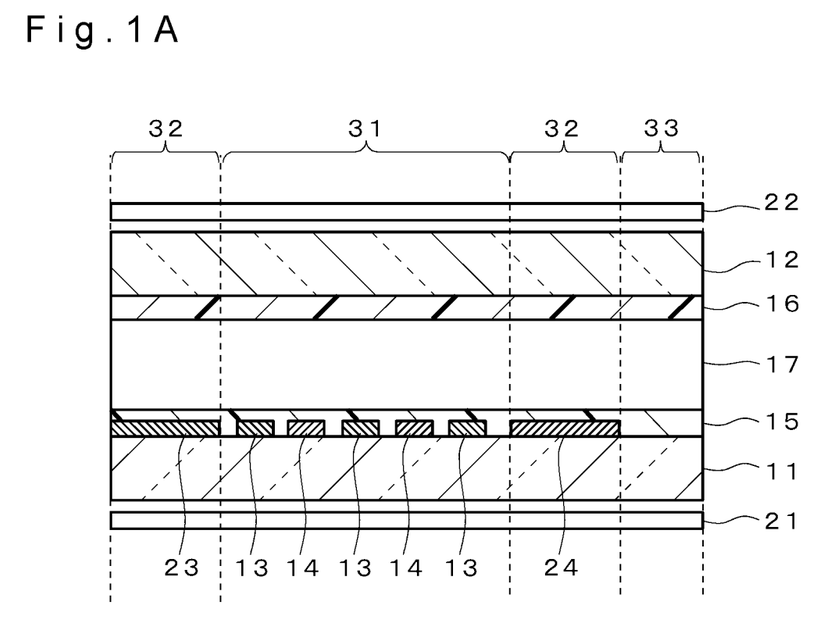
FIG. 1A and FIG. 1B are cross-sectional views showing the configuration of the liquid crystal display device of embodiment 1.
Figure 1B:
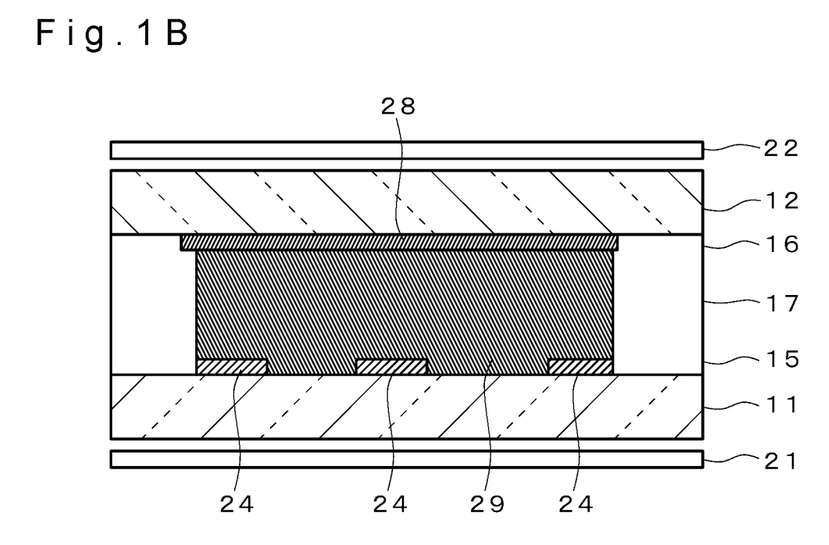

FIG. 1A and FIG. 1B are cross-sectional views showing the configuration of the liquid crystal display device of embodiment 1. This liquid crystal display device comprises a first substrate 11 and a second substrate 12 disposed facing each other, and a liquid crystal layer 17 disposed between the first substrate 11 and the second substrate 12 as a basic configuration. For example, the liquid crystal display device of this embodiment is configured so that the area where the electrodes overlap each other directly forms the characters and designs that the user wants to display, is basically capable of displaying only predetermined characters and the like, that is, only standard characters and the like, and is a segment display-type liquid crystal display wherein generally an area of about 50% or less in terms of the area ratio inside the effective display area contributes to the display of characters and the like. Note that the liquid crystal display device may include both a dot matrix display type wherein a plurality of pixels are arranged in a matrix pattern and a segment display type.

The first substrate 11 and the second substrate 12 are each a transparent substrate, such as a glass substrate, plastic substrate, or the like, for example. As shown, the first substrate 11 and the second substrate 12 are bonded together with a predetermined gap (approximately 3 μm (micrometers), for example) therebetween. The gap between the first substrate 11 and the second substrate 12 is maintained by rod-shaped or spherical spacers contained in a frame-shaped sealing material (not shown) and spherical spacers evenly distributed and disposed inside the substrate surface.

A first electrode 13, a second electrode 14, a lead wiring (first lead wiring) 23, and a lead wiring (second lead wiring) 24 are each provided to one surface side of the first substrate 11. The first electrode 13 is connected to the lead wiring 23, and the second electrode 14 is connected to the lead wiring 24. The first electrode 13, the second electrode 14, and the lead wirings 23 and 24 are each configured by suitably patterning a transparent conductive film, such as indium-tin oxide (ITO), for example. The first electrode 13 and the second electrode 14 are comb-tooth shaped electrodes consisting of a plurality of electrode branches, and are disposed so that the electrode branches of one alternately mesh with the electrode branches of the other.

A jumper wiring 28 is provided to one surface side of the second substrate 12 (refer to FIG. 1B). This jumper wiring 28 is electrically and physically connected to respective portions of two or more of a plurality of the lead wirings 24 provided to the first substrate 11 side via a conductive material 29. With this arrangement, the two or more lead wirings 24 on the first substrate 11 side are electrically connected to each other via the conductive material 29 and the jumper wiring 28. The conductive material 29 referred to here is a silver paste or conductive particle, for example. Further, the sealing material (not shown) for sealing the liquid crystal layer 17 may contain conductive particles in part or in whole, causing the sealing material to function as the conductive material 29 as well.

A first alignment film 15 is provided so as to cover the first electrode 13, the second electrode 14, and each of the lead wirings 23 and 24 on one surface side of the first substrate 11. A second alignment film 16 is provided to one surface side of the second substrate 12. A planer alignment film that restricts the orientation of the liquid crystal layer 17 to a horizontal orientation is used as the first alignment film 15 and the second alignment film 16. A uniaxial orientation process such as a rubbing process is performed on each alignment film.

The liquid crystal layer 17 is provided between the first substrate 11 and the second substrate 12. In this embodiment, the liquid crystal layer 17 is configured using a liquid crystal material with a negative dielectric constant anisotropy $\Delta\epsilon$ (delta epsilon). The liquid crystal layer 17 of this embodiment is set in a horizontal orientation in which the direction of orientation of the liquid crystal molecules when a voltage is not applied is substantially horizontal with respect to each substrate surface of the first substrate 11 and the second substrate 12.

A first polarizing plate 21 is disposed on the outside of the first substrate 11. Similarly, a second polarizing plate 22 is disposed on the outside of the second substrate 12. The first polarizing plate 21 is disposed so that an absorption axis thereof is substantially parallel to the direction of orientation of the liquid crystal molecules of the liquid crystal layer 17, for example. Further, the second polarizing plate 22 is disposed so that an absorption axis thereof is substantially orthogonal to the absorption axis of the first polarizing plate 21, for example. Note that an optical compensating plate, such as a C plate, may be suitably disposed between each polarizing plate and each substrate.

As shown in FIG. 1A, the effective display area of the liquid crystal display device includes a display part (display area) 31 wherein the first electrode 13 and the second electrode 14 are disposed, a lead wiring part (lead wiring area) 32 wherein only the lead wiring 23 or the lead wiring 24 is disposed, and a non-display part (non-display area) 33 where neither an electrode nor a lead wiring is disposed. Each electrode branch of the first electrode 13 and the second electrode 14 is alternately disposed at regular intervals in the display part 31. An electric field substantially parallel to one surface of the first substrate 11 can be applied to the liquid crystal layer 17 by applying voltage between the first electrode 13 and the second electrode 14 via each of the lead wirings 23 and 24. As a result, the orientation of the liquid crystal molecules of the liquid crystal layer 17 of the display part 31 changes, making it possible to control the brightness.

Figure 2:
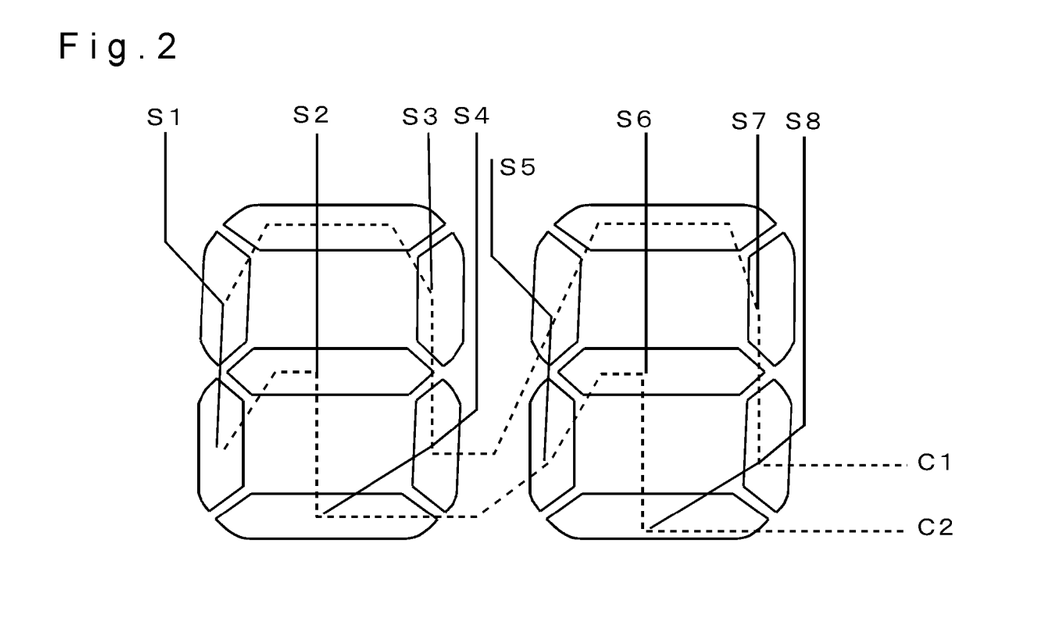
FIG. 2 is a diagram for explaining the connected state of the liquid crystal display device of embodiment 1.

FIG. 2 is a diagram for explaining the connected state of the liquid crystal display device of embodiment 1. Here, the connected state of a segment display-type liquid crystal display device capable of displaying a two-digit number is shown. The number of each digit is respectively expressed using seven display parts (segment display parts), with 14 display parts existing in total. According to this embodiment, a case where each display part of such a segment display type is multiplex driven based on ½ duty is considered. Eight wirings S1 to S8 indicated by a solid line show the connected state of each first electrode (segment electrode), and two wirings C1 and C2 indicated by a dotted line show the connected state of each second electrode (scanning electrode).

Figure 3:
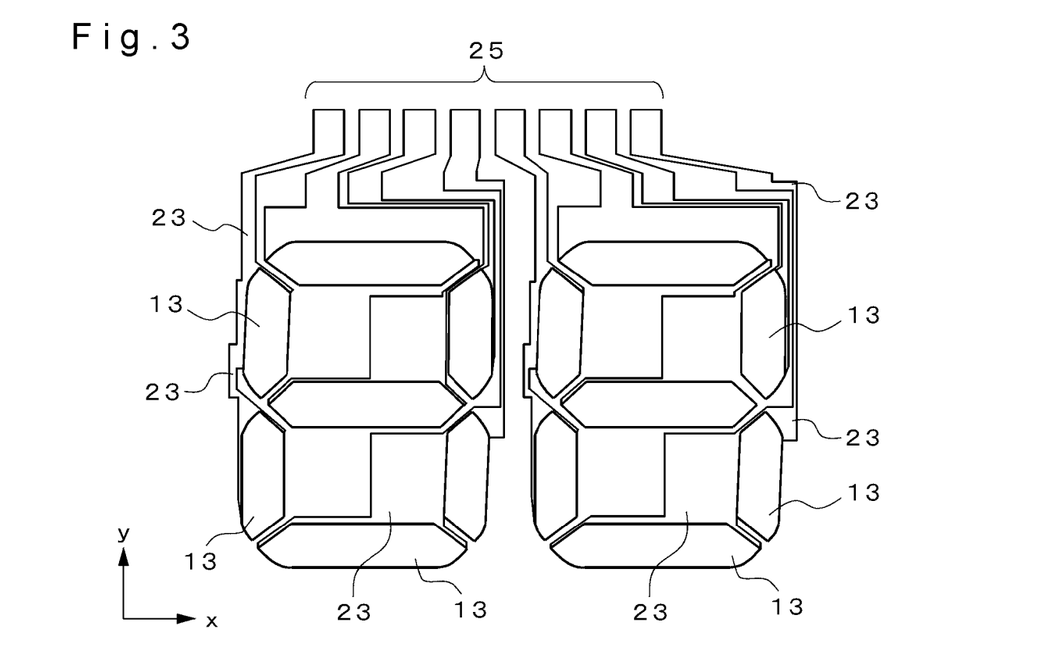
FIG. 3 is a plan view showing a configuration example of the first electrode (segment electrode) and lead wirings of the liquid crystal display device of embodiment 1.

FIG. 3 is a plan view showing a configuration example of the first electrode (segment electrode) and lead wirings of the liquid crystal display device of embodiment 1. As shown in FIG. 3, each of the first electrodes 13 is respectively and correspondingly provided to a total of 14 display parts for displaying the two-digit number. Note that, although not shown, these character sections are made of comb-tooth shaped electrodes. A reference numeral is provided only for a few representative first electrodes 13. The lead wiring 23 is connected to each of the first electrodes 13. A reference numeral is provided only for a few representative lead wirings 23. An external extraction electrode terminal 25 is a terminal for connection to an external driving circuit (not shown), and is connected to each of the lead wirings 23.

Figure 4:
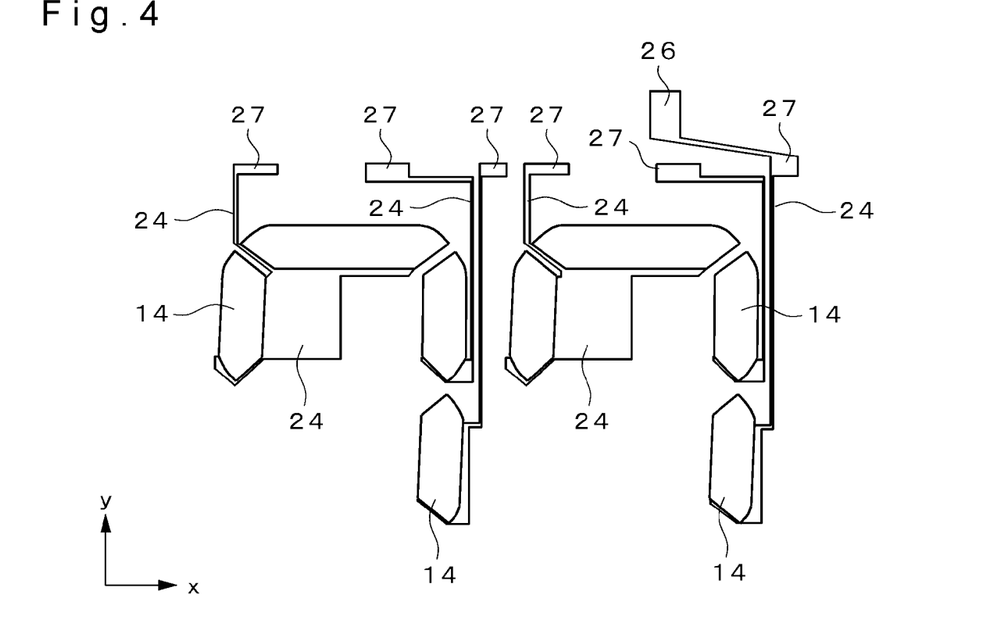
FIG. 4 is a plan view showing a configuration example of the second electrode (common electrode) and a part of a lead wiring of the liquid crystal display device of embodiment 1.
Figure 5:
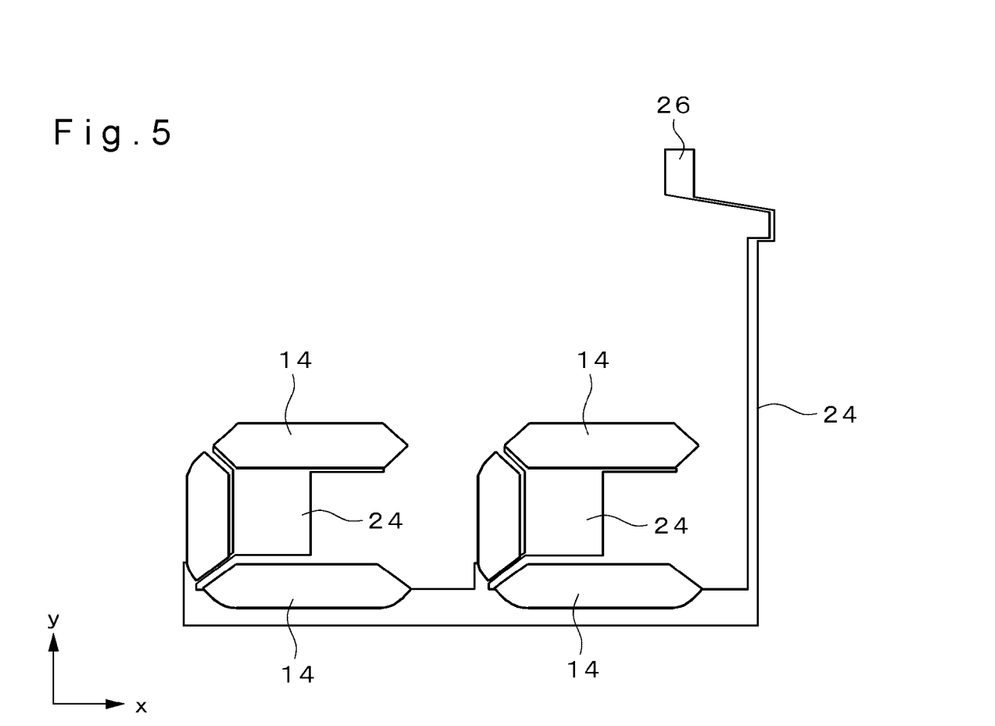
FIG. 5 is a plan view showing a configuration example of the second electrode (common electrode) and a part of a lead wiring of the liquid crystal display device of embodiment 1.
Figure 6A:
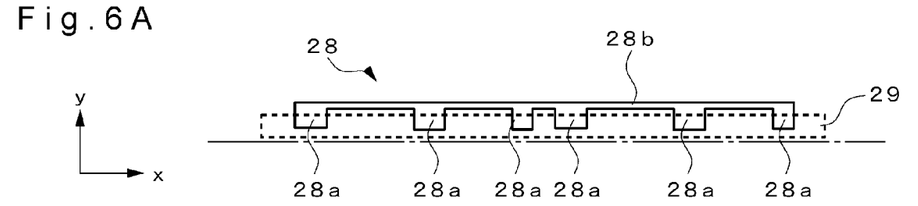
FIG. 6A and FIG. 6B are plan views showing a configuration example of the jumper wiring of the liquid crystal display device of embodiment 1.
Figure 6B:
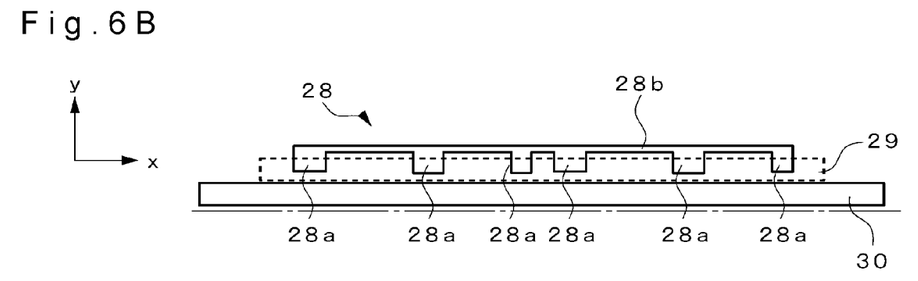

FIG. 4 and FIG. 5 are each a plan view showing a configuration example of the second electrode (common electrode) and a part of a lead wiring of the liquid crystal display device of embodiment 1. Further, FIG. 6A and FIG. 6B are plan views showing a configuration example of the jumper wiring of the liquid crystal display device of embodiment 1. Each of the second electrodes 14 is respectively and correspondingly provided to a total of 14 display parts for displaying the two-digit number. FIG. 4 and FIG. 5 show a portion of each of the second electrodes 14, and more specifically a section corresponding to one of the above described two wirings C1 and C2. Note that, although not shown, these character sections are made of comb-tooth shaped electrodes. A reference numeral is provided only for a few representative second electrodes 14. The lead wiring 24 is connected to each of the second electrodes 14. A reference numeral is provided only for a few representative lead wirings 24.

Each of the lead wirings 24 shown in FIG. 4 include wires not respectively directly connected to an external extraction electrode terminal 26, but rather separated into islands on one surface of the first substrate 11, each comprising a conduction pad part 27. Further, the lead wirings 24 also include wirings connected to the external extraction electrode terminal 26 and comprising the conduction pad part 27. The area between these conduction pad parts 27 is electrically and physically connected to a pad part 28a of the jumper wiring 28 of the second substrate 12 (refer to FIGS. 6A, 6B) via the conductive material 29. The conduction pad part 27 is provided to a position that overlaps with the sealing material, which is the conductive material 29. If the conductive material 29 and the sealing material are separate materials, the conductive material 29 is preferably disposed in a position away from a sealing material 30, further outward than the sealing material 30. With this arrangement, each of the lead wirings 24 is interconnected. Further, with this arrangement, the lead wirings 24 separated into islands are also electrically connected to the external extraction electrode terminal 26 via the jumper wiring 28. On the other hand, each of the lead wirings 24 shown in FIG. 5 is directly connected to the external extraction electrode terminal 26, without comprising a conduction pad part. The external extraction electrode terminal 26 is an electrode for connection to an external driving circuit that is not shown, and is connected to the lead wirings 24.

In a case where the sealing material also serves as the conductive material 29, the jumper wiring 28 is preferably disposed in an area (peripheral area) where at least a wiring part 28b for interconnecting each of the pad parts 28a is further outward than the sealing material, which is the conductive material 29, and away from the sealing material, as shown in FIG. 6A. Further, each of the pad parts 28a is disposed in a position that overlaps with the sealing material, which is the conductive material 29. Further, in a case where the conductive material 29 and the sealing material are configured as separate materials, each of the pad parts 28a and the conductive material 29 are preferably disposed in positions further outward than the sealing material 30, away from the sealing material 30, as shown in FIG. 6B. With this arrangement, the display part 31 can be more widely achieved. Note that the matters described here hold true for a liquid crystal display device of embodiment 2 described later as well.

Figure 7:
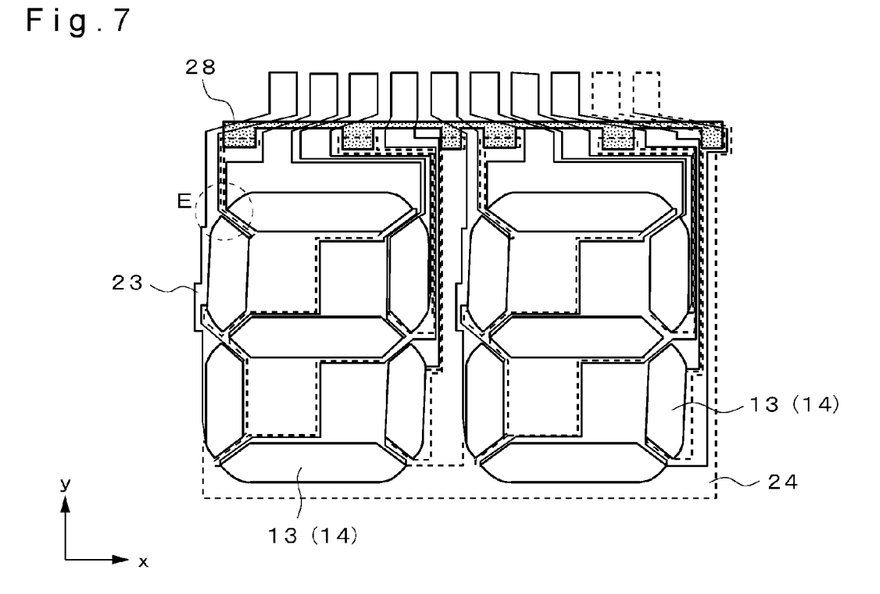
FIG. 7 is a plan view showing the first electrode and the second electrode of the liquid crystal display device of embodiment 1 together.

FIG. 7 is a plan view showing the first electrode and the second electrode of the liquid crystal display device of embodiment 1 together. Note that FIG. 7 indicates the second electrode 14 and the lead wiring 24 by dotted lines as a matter of convenience for distinguishing the first electrode 13 and the lead wiring 23 from the second electrode 14 and the lead wiring 24. As shown, the first electrode 13 and the second electrode 14 are both provided on the same surface of the first substrate 11. Further, the lead wirings 23 and 24 are also provided on the same surface of the first substrate 11. In contrast, the jumper wiring 28 is provided on one surface side of the second substrate 12, and is connected to two or more (six in this example) of a plurality of the lead wirings 24 via the conductive material 29. One of these is the lead wiring 24 directly connected to the external extraction electrode terminal 26.

Figure 8:
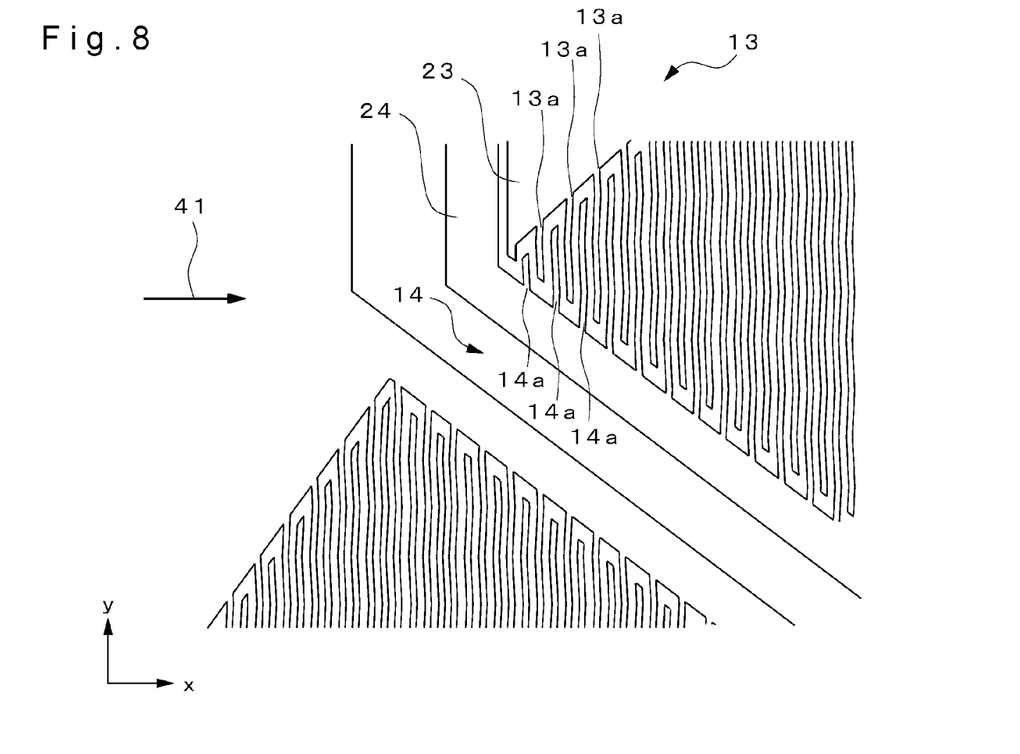
FIG. 8 is a plan view showing a detailed configuration example of the first electrode and the second electrode.

FIG. 8 is a plan view showing a detailed configuration example of the first electrode and the second electrode. This figure shows a configuration example of the first electrode 13 and the second electrode 14 of area E shown in the above described FIG. 7. As shown, respective electrode branches 13a and 14a of the first electrode 13 and the second electrode 14 are alternately disposed along the x direction and extend along the y direction. Each of the electrode branches 13a and 14a comprises a bent edge. Each of the edges comprises a structure wherein an electrode edge that forms an angle of −3° (minus three degrees) is alternately disposed and connected to an electrode edge that form an angle of +3° (plus three degrees) with respect to the y direction, which is the extending direction of each of the electrode branches. The electrode width of each of the electrode branches 13a and 14a is 15 μm (micrometers), and the disposed interval of the adjacent electrode branches 13a and 14a is set to 15 μm (micrometers). Note that the electrode width and disposed interval do not need to be equal. Further, the electrode width is preferably set to about 5-30 μm (micrometers). Further, each of the lead wirings 23 and 24 preferably comprises a contour that is substantially parallel or substantially orthogonal to the y direction, which is the extending direction of each of the electrode branches 13a and 14a, to the extent possible.

In a case where a liquid crystal material comprising a negative dielectric constant anisotropy is used for the liquid crystal layer 17 as described above, a direction of orientation 41 of the liquid crystal molecules at the substantial center in the layer thickness direction of the liquid crystal layer 17 can be set to the x direction, which is the direction orthogonal to the extending direction of each of the electrode branches 13a and 14a, as shown, for example. Note that, in a case where a liquid crystal material comprising a positive dielectric constant anisotropy is used, the direction of orientation 41 can be set to the y direction, which is the direction parallel to the extending direction of each of the electrode branches 13a and 14a, for example. With this arrangement, it is possible to reverse with respect to one another the in-plane rotation direction of the liquid crystal molecules when voltage is applied in each area where the bending direction of the bent edge differs, thereby making it possible to achieve a dual-domain alignment and thus improve viewing angle dependency.

Embodiment 2

The liquid crystal display device of embodiment 2 comprises the same configuration as the liquid crystal display device of the above described embodiment 1 (refer to FIG. 1, etc.). Accordingly, when the liquid crystal display device of embodiment 2 is described below, the same names and reference numerals are used for the components common to the liquid crystal display device of embodiment 1, and the detailed descriptions thereof are suitably omitted.

Figure 9:
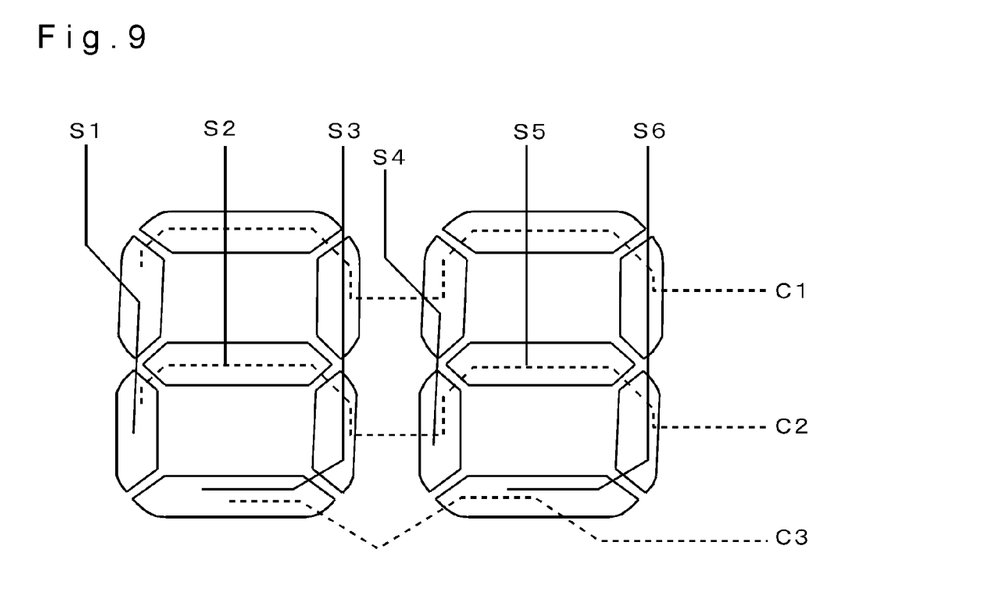
FIG. 9 is a diagram for explaining the connected state of the liquid crystal display device of embodiment 2.

FIG. 9 is a diagram for explaining the connected state of the liquid crystal display device of embodiment 2. Here, the connected state of a segment display-type liquid crystal display device that displays a two-digit number is shown. The number of each digit is respectively expressed using seven display parts (segment display parts), with 14 display parts existing in total. According to this embodiment, a case where each display part of such a segment display type is multiplex driven based on ⅓ duty is considered. Six wirings S1 to S6 indicated by a solid line show the connected state of each first electrode (segment electrode), and three wirings C1, C2, and C3 indicated by a dotted line show the connected state of each second electrode (scanning electrode).

Figure 10:
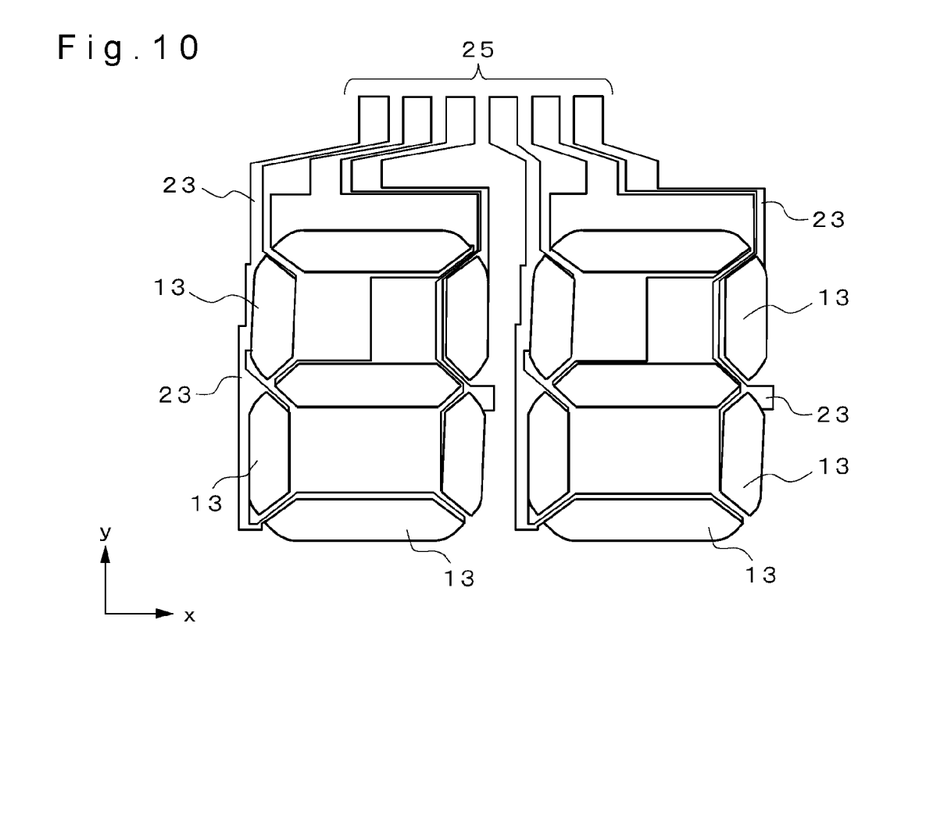
FIG. 10 is a plan view showing a configuration example of the first electrode (segment electrode) and lead wirings of the liquid crystal display device of embodiment 2.

FIG. 10 is a plan view showing a configuration example of the first electrode (segment electrode) and lead wirings of the liquid crystal display device of embodiment 2. As shown in FIG. 10, each of the first electrodes 13 is respectively and correspondingly provided to a total of 14 display parts for displaying the two-digit number. These character sections are made of comb-tooth shaped electrodes, similar to the liquid crystal display device of embodiment 1 (refer to the above described FIG. 8). A reference numeral is provided only for a few representative first electrodes 13. The lead wiring 23 is connected to each of the first electrodes 13. A reference numeral is provided only for a few representative lead wirings 23. An external extraction electrode terminal 25 is a terminal for connection to an external driving circuit (not shown), and is connected to each of the lead wirings 23. According to this embodiment, compared to the liquid crystal display device of embodiment 1, the number of external extraction electrode terminals 25 is decreased to six.

Figure 11:
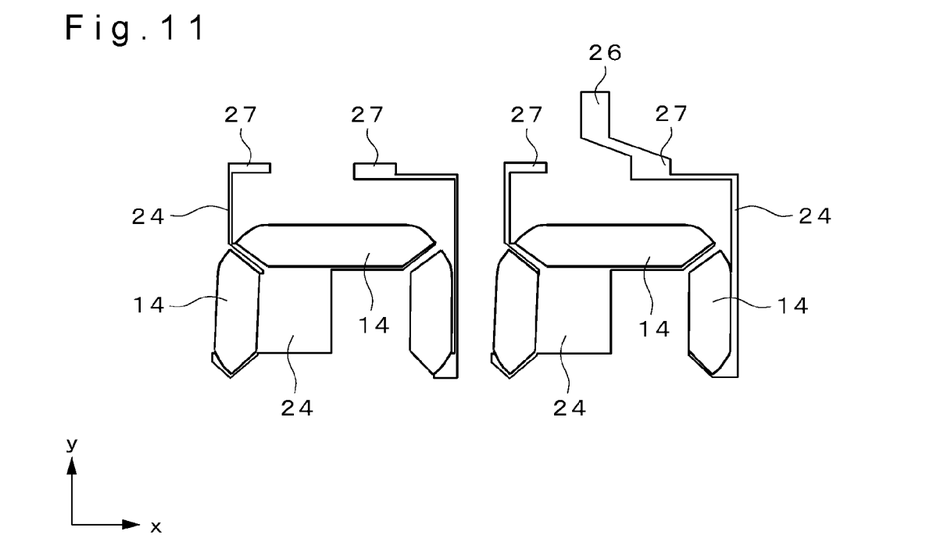
FIG. 11 is a plan view showing a configuration example of the second electrode (common electrode) and a part of a lead wiring of the liquid crystal display device of embodiment 2.
Figure 12:
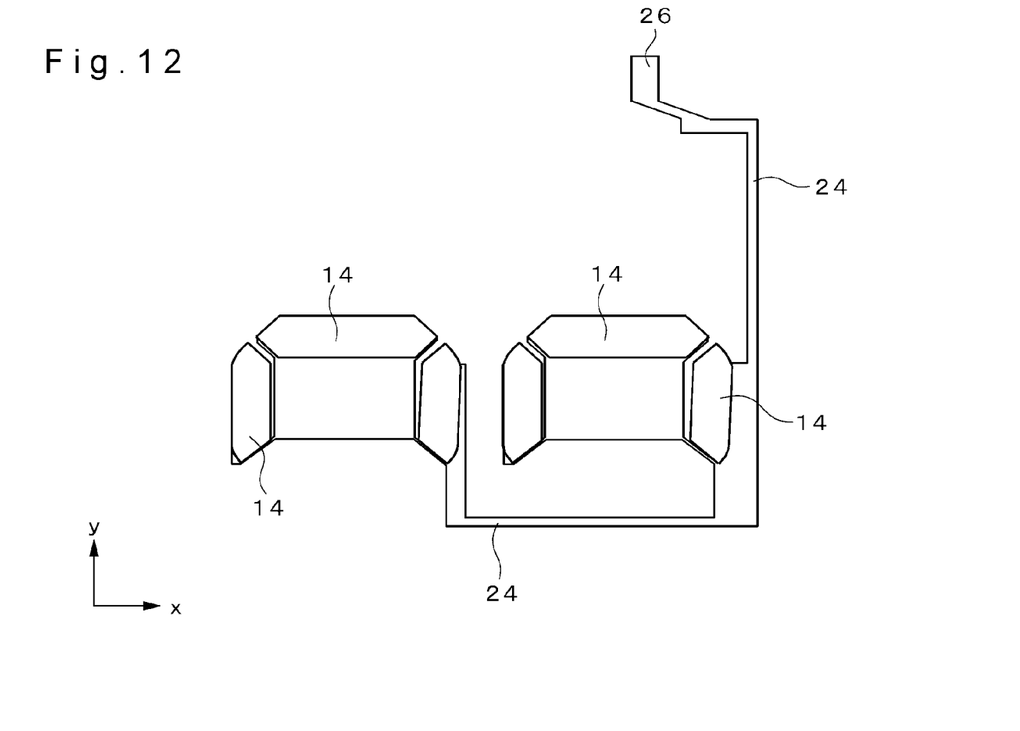
FIG. 12 is a plan view showing a configuration example of the second electrode (common electrode) and a part of a lead wiring of the liquid crystal display device of embodiment 2.
Figure 13:
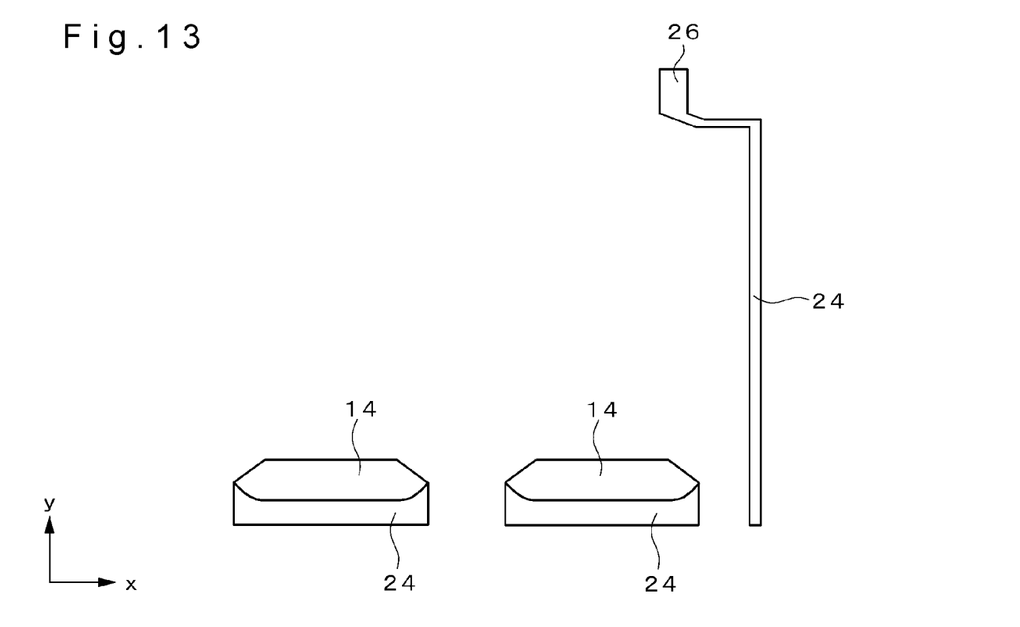
FIG. 13 is a plan view showing a configuration example of the second electrode (common electrode) and a part of a lead wiring of the liquid crystal display device of embodiment 2.
Figure 14:
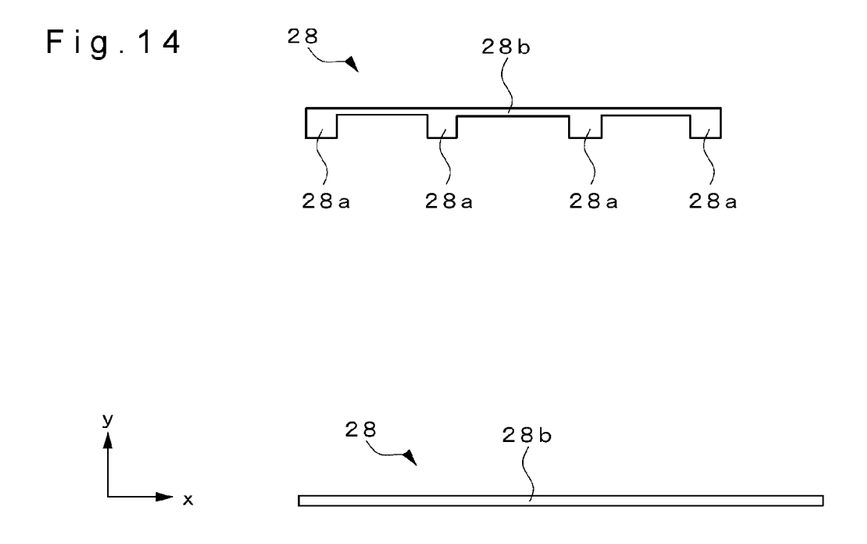
FIG. 14 is a plan view showing a configuration example of the jumper wiring of the liquid crystal display device of embodiment 2.

FIG. 11, FIG. 12, and FIG. 13 are each a plan view showing a configuration example of the second electrode (common electrode) and a part of a lead wiring of the liquid crystal display device of embodiment 2. Further, FIG. 14 is a plan view showing a configuration example of the jumper wiring of the liquid crystal display device of embodiment 2. Each of the second electrodes 14 is respectively and correspondingly provided to a total of 14 display parts for displaying the two-digit number. FIG. 11, FIG. 12, and FIG. 13 show a portion of each of the second electrodes 14, and more specifically a section corresponding to one of the above described three wirings C1, C2, and C3. These character sections are made of comb-tooth shaped electrodes, similar to the liquid crystal display device of embodiment 1 (refer to the above described FIG. 8). A reference numeral is provided only for a few representative second electrodes 14. The lead wiring 24 is connected to each of the second electrodes 14. A reference numeral is provided only for a few representative lead wirings 24.

Each of the lead wirings 24 shown in FIG. 11 include wires not respectively directly connected to the external extraction electrode terminal 26, but rather separated into islands on one surface of the first substrate 11, each comprising the conduction pad part 27. Further, the lead wirings 24 also include wirings connected to the external extraction electrode terminal 26 and comprising the conduction pad part 27. The area between these four conduction pad parts 27 is electrically and physically connected to the pad part 28a of the jumper wiring 28 (refer to FIG. 14) on the upper side in the figure of the two jumper wirings 28 provided to one surface side of the second substrate 12 via the conductive material. With this arrangement, each of the lead wirings 24 is interconnected. The conduction pad part 27 is provided to a position that overlaps with the sealing material, which is the conductive material 29. If the conductive material 29 and the sealing material are separate materials, the conductive material 29 is preferably disposed in a position further outward than the sealing material 30, away from the sealing material 30. Similarly, each of the lead wirings 24 shown in FIG. 13 is not respectively directly connected to the external extraction electrode terminal 26, but rather separated into islands on one surface of the first substrate 11. Further, the lead wirings 24 include wirings connected to the external extraction electrode terminal 26. While each of the lead wirings 24 does not comprise a conduction pad part 27 unlike FIG. 11, a portion of the lead wirings 24 operates in the same manner. That is, the portion of three lead wirings 24 is electrically and physically connected to the jumper wiring 28 on the lower side in the figure (refer to FIG. 14) of the two jumper wirings 28 provided to one surface side of the second substrate 12 via the conductive material. With this arrangement, each of the lead wirings 24 is interconnected. However, in a case where the sealing material 30, which is the conductive material 29, is used in combination with the jumper wiring 28 of FIG. 13 and FIG. 14, conduction occurs in sections where the lead wirings other than those shown overlap with the jumper wiring 28 and the sealing material 30, if such sections exist. It is necessary, therefore, to either take care to ensure that other lead wirings do not exist below the sealing material 30 or provide the conductive material 29 separate from the sealing material 30 only in sections where the lead wiring 24 and the jumper wiring 28 overlap. Note that in the example of FIG. 13, unlike the example of FIG. 11, one of the lead wirings 24 is the lead wiring 24 that is dedicated to connection to the external extraction electrode terminal 26 and not directly connected to the second electrode 14, but to other lead wirings 24 via the jumper wiring 28. On the other hand, the lead wirings 24 shown in FIG. 12 are directly connected to the external extraction electrode terminal 26, without comprising a conduction pad part. The external extraction electrode terminal 26 is a terminal for connection to an external driving circuit that is not shown, and is connected to the lead wirings 24.

Figure 15:
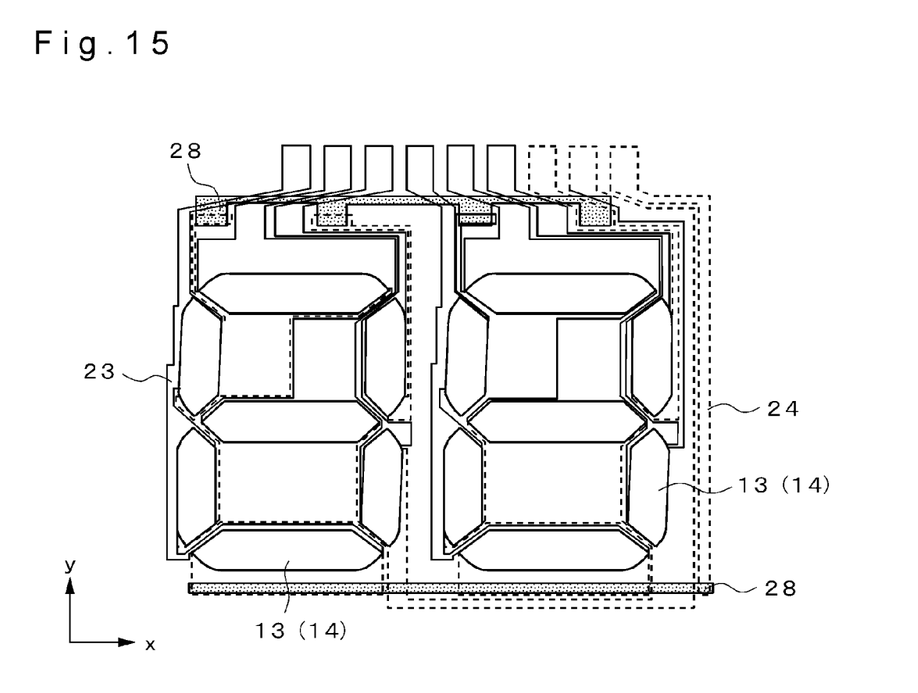
FIG. 15 is a plan view showing the first electrode and the second electrode of the liquid crystal display device of embodiment 2 together.

FIG. 15 is a plan view showing the first electrode and the second electrode of the liquid crystal display device of embodiment 2 together. Note that FIG. 15 indicates the second electrode 14 and the lead wiring 24 by dotted lines as a matter of convenience for distinguishing the first electrode 13 and the lead wiring 23 from the second electrode 14 and the lead wiring 24. As shown, the first electrode 13 and the second electrode 14 are both provided on the same surface of the first substrate 11. Further, the lead wirings 23 and 24 are also provided on the same surface of the first substrate 11. In contrast, the jumper wiring 28 is provided on one surface side of the second substrate 12, and is connected to two or more of the plurality of lead wirings 24 via the conductive material.

According to the liquid crystal display device of each embodiment such as described above, several of the lead wirings 23 provided to the first substrate 11 side are configured to be connected to each other via the jumper wiring 28 provided to the second substrate 12 side, thereby making it possible to increase the freedom of the wiring layout on the substrate. With this arrangement, each electrode and lead wiring are readily disposed on the same surface without providing a crossing section, making it possible to achieve a direct-multiplex-driven IPS mode liquid crystal display device suitable for a segment display type.

Note that this invention is not limited to the subject matter of the foregoing embodiments, and can be implemented by being variously modified within the scope of the gist of the present invention. For example, while a case where the liquid crystal layer has a uniaxial horizontal orientation when voltage is not applied has been described in the above described embodiment, the orientation of the liquid crystal layer is not particularly limited thereto.

Further, while a portion of the lead wirings 24 is connected via the jumper wiring 28 in the above described embodiment, all lead wirings 24 may be connected via the jumper wiring 28.

Figure 16:
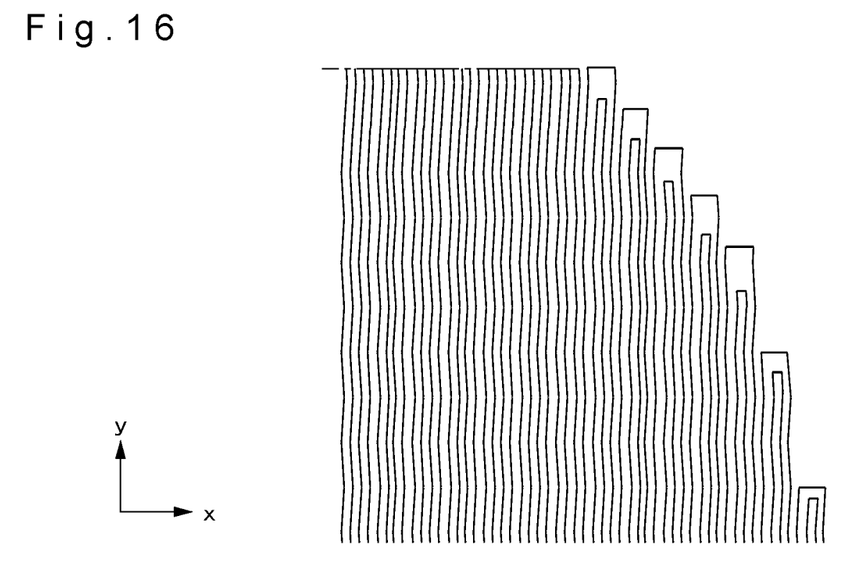
FIG. 16 is a plan view showing another configuration example of the first electrode and the second electrode.

Further, while ends of the first electrode and the second electrode are formed in alignment with the section where the contour of the display part is not parallel to either the x direction or the y direction in the above described embodiment, the ends of the first electrode and the second electrode may be formed into a step-like shape corresponding to the contour of the display part, as illustrated by the example in FIG. 16. Thus, the contour of the display part is curved in shape and the section that is not parallel to either the x direction or the y direction is formed into a step-like shape in alignment with the contour as shown in FIG. 16, making it possible to suppress even slight occurrences of light omission at the ends of the first electrode and the second electrode.

What is claimed is:

1. A liquid crystal display device comprising a display part for displaying standard characters or designs, the liquid crystal display device further comprising:
    a liquid crystal layer;
    a first substrate and a second substrate which are disposed facing each other and which sandwich the liquid crystal layer;
    a plurality of first electrodes provided on a first surface side of the first substrate;
    a plurality of second electrodes provided on the first surface side of the first substrate;
    a plurality of first lead wirings provided on the first surface side of the first substrate, each of the plurality of first lead wirings connected to one of the plurality of first electrodes;
    a plurality of second lead wirings provided on the first surface side of the first substrate, each of the plurality of second lead wirings connected to one of the plurality of second electrodes;
    a jumper wiring provided on a first surface side of the second substrate and superimposed with respective portions of two or more second lead wirings of the plurality of second lead wirings, wherein the jumper wiring crosses at least one of the plurality of first lead wirings in plan view; and
    a conductive material interposed between each portion of the two or more second lead wirings and the jumper wiring, between the first substrate and the second substrate.

2. The liquid crystal display device according to claim 1, wherein:
    an area where the first substrate and the second substrate overlap includes a display area and a peripheral area; and
    said each portion of the two or more second lead wirings and the jumper wiring are disposed in the peripheral area.

3. The liquid crystal display device according to claim 2, further comprising:
    a sealing material which is interposed between the first substrate and the second substrate in the peripheral area, and which encloses the liquid crystal layer;

wherein said each portion of the two or more second lead wirings and the jumper wiring are superimposed with the sealing material and disposed in the peripheral area; and wherein the sealing material comprises conducting properties in at least an area where the sealing material comes in contact with said each portion of the two or more second lead wirings and the jumper wiring, and serves as the conductive material.

4. The liquid crystal display device according to claim 2, further comprising a sealing material which is interposed between the first substrate and the second substrate in the peripheral area, and which encloses the liquid crystal layer;

wherein said each portion of the two or more second lead wirings and the jumper wiring are disposed further outward than the sealing material in the peripheral area.

5. The liquid crystal display device according to claim 1, wherein:

the plurality of first electrodes and the plurality of second electrodes respectively comprise a plurality of electrode branches;

each of the plurality of first electrodes forms a pair with one of the plurality of second electrodes; and a first electrode and a second electrode that form the pair are disposed so that the plurality of electrode branches of the plurality of first and second electrodes are alternately arranged.

* * * * *